Sept. 1, 1936.　　　J. CHRISTIE ET AL　　　2,052,554
CAMERA BED LATCH
Filed Oct. 2, 1935

INVENTORS:
John Christie & Chester W. Crumrine,
BY Newton M. Perrins,
Donald H. Stewart
ATTORNEYS.

Patented Sept. 1, 1936

2,052,554

UNITED STATES PATENT OFFICE 2,052,554

CAMERA BED LATCH

John Christie and Chester W. Crumrine, Rochester, N. Y., assignors to Eastman Kodak Company, Rochester, N. Y., a corporation of New York Application October 2, 1935, Serial No. 43,231

11 Claims. (Cl. 95—40)

This invention relates to photography and more particularly to photographic cameras. One object of our invention is to provide a camera with a single latch which functions both for opening and closing the camera bed. Another object of our invention is to provide a camera of the type having a hinged camera bed with a mechanism for automatically projecting the camera parts into a picture-taking position and to provide such a structure with a single latch element which can be used for holding the camera in an open or closed position. Another object of our invention is to provide a camera with a push button release on one side of the camera adapted to simultaneously release the bed braces from a latched position with respect to the camera body, permitting the camera bed to fold. Still another object of our invention is to provide a novel form of latch for camera beds and other objects will appear from the following specification, the novel features being particularly pointed out in the claims at the end thereof.

Coming now to the drawing wherein like reference characters denote like parts throughout;

Our invention comprises a structure for opening and closing a camera in which a single push button is used both to unlatch the camera bed braces and to unlatch the interengaging elements on the camera body and bed.

While our improved latch structure is adapted for use on any camera including a hinged bed supported by bed braces, it is particularly adapted for use with a camera of the automatic self-erecting front type, such as is shown in U. S. Patent No. 1,976,339, Fuerst, granted October 9, 1934.

Figure 1:
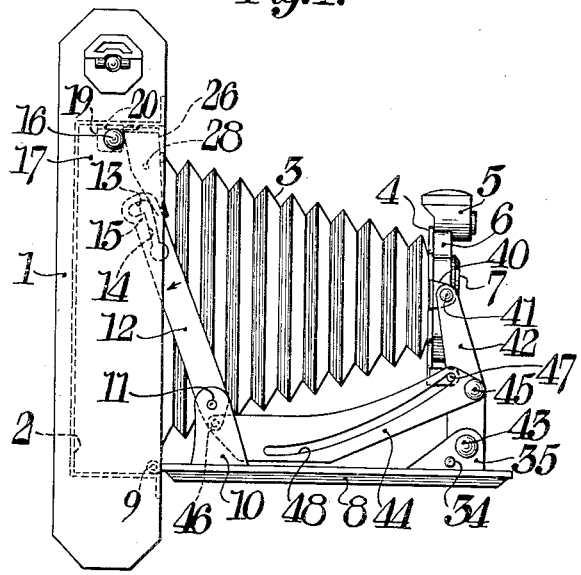
Fig. 1 is a side elevation of a camera equipped with a bed release constructed in accordance with and embodying a preferred form of our invention.

Referring to Fig. 1 the camera may consist of a body portion 1 having an opening 2 in the center for receiving one end of a bellows 3 which is connected at its opposite end to a lens board 4. This lens board may support the usual finder 5 and shutter 6 which carries the objective, one element of which may be mounted in the lens cell 7.

The camera opening 2 may be closed by a bed 8 which is attached by means of a hinge 9 to the camera body. Extending upwardly from the bed are brackets 10 carrying studs 11 on which the bed braces 12 are pivotally mounted at one end, the opposite end of the braces having a pin and slot connection 13 and 14 with the camera body, there being a hook 15 at one end of the slot.

When the pin 13, carried by the camera body, lies behind the end of the hook 15, the camera bed 8 is definitely positioned in an open, operative or picture-taking position. When the bed is to be folded the hook 15 must be released by moving the bed braces in the direction shown by the arrow in Fig. 1. This is usually accomplished by pressing inwardly upon each bed brace but this operation is rather awkward and requires two hands and requires that pressure be applied to the two braces.

Figure 3:
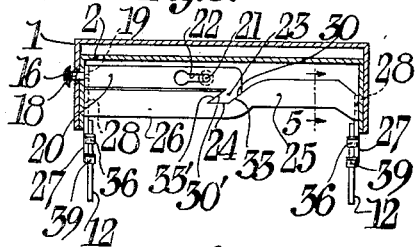
Fig. 3 is a fragmentary view part in section showing the structure of the latch-operating mechanism.
Figures 4, 5:
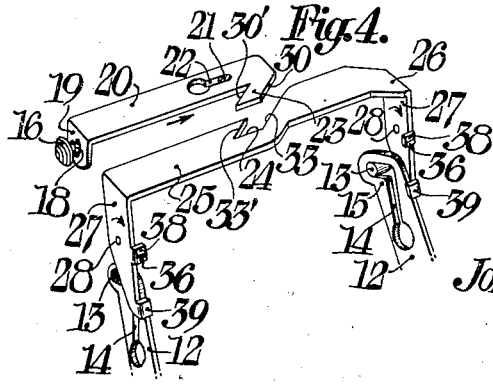
Fig. 4 is a fragmentary perspective view of the relation of the various latch-operating parts.
Fig. 5 is a fragmentary part section and part elevation of a portion of the bed latching mechanism.

To overcome this awkward step in closing a camera, we have provided the mechanism, best shown in Fig. 4. On the outside of the camera body we provide a single push button release 16, this push button being normally held away from the camera body wall 17 by means of a coil spring 18. The push button 16 is attached to a turned-over lug 19 forming a part of the slide 20, this slide being mounted upon a stud 21, shown in Fig. 3, the stud passing through the slot 22. A second extension 23 is formed on the slide 22, this extension normally fitting into a complementary-shaped opening 24 in the cross bar 25 of the yoke member designated broadly as 26. This yoke is provided with a pair of downwardly extending arms 27, each of which is pivotally attached, by studs passing through apertures 28, to the camera body. Thus the yoke may rock about this pivotal connection as indicated by the arrows in Fig. 4.

When the push button 16 is depressed, the slide 20 moves inwardly causing the cam surface 30 through engagement with the cam surface 33 to move the yoke upon its pivotal points, causing the arms 27 to turn as indicated by the arrows in Fig. 4. This movement accomplishes two results.

The first result is that pins 34, carried by brackets on the camera bed which lie behind the lugs 36 of the yoke are released, this action being best illustrated in Fig. 5 which indicates that when the parts are in their full line position the pins 34 are retained behind the lugs 36. However, when the push button 16 is depressed and the yoke is rocked to its broken line position, the lugs 36 move from in front of the pins 34, permitting the camera bed 8 to open to the position shown in Fig. 1. In closing the camera bed, if the parts should be in the full line position when the pins 34 strike the camera surface 38, a slight movement of the yoke will permit the pins to snap behind the locking lugs 36.

The second function of the yoke is to release the bed braces. As indicated in Fig. 4, when the yoke 26 turns in the direction shown by the arrows, the lugs 39 which engage edges of the bed braces 12 thrust the bed braces rearwardly to the position shown in Fig. 2 in which the pins 13 are moved from behind the hooks 15 so that the camera can be closed. Thus in both opening and closing the camera the yoke 26 is rocked upon the pivots 28 and a single push button 16 serves the dual purpose of controlling the latch which permits opening the camera and for controlling the bed brace latches which must be released before the camera can be closed.

Figure 2:
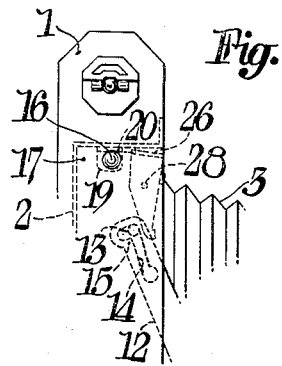
Fig. 2 is a fragmentary side elevation showing a part of the camera shown in Fig. 1 but with the release mechanism in a different position.

It should be noted also that cam surface 30' may engage cam surface 33' of the yoke, thus rocking yoke 26 back to its original or Fig. 2 position when the push button 16 is released. The yoke 26 is, therefore, cammed in two directions by the slide 20.

While it is not necessary that our invention be applied to an automatically erecting front camera, we have illustrated a camera as shown in the above-mentioned Fuerst patent. In accordance with this patent, the front board 4 carries brackets 40 pivotally supporting at 41 erecting arms 42 which are pivotally attached at 43 to the brackets 35. Side arms 44 are pivotally attached at 45 to the arms 42 and are pivotally attached at 46 to the end of the bed braces 12. Pins 47 are carried by the lens board 4 and may slide in the slots 48 in the arms 44, all as is fully described in the Fuerst patent, mentioned above. Thus when the camera bed is opened, the camera objective is automatically projected by the linkage above described into a picture-taking position and when the camera bed braces are released by rocking the yoke, the camera bed and its associated linkage permit the camera to be folded.

The operation of our invention is extremely simple. With the camera in a folded position an operator may conveniently, with one hand, depress the push button 16, rocking the yoke 26 from the position shown in Fig. 1 to the position shown in Fig. 2. As is also indicated in Fig. 5, this operation moves the lugs 36 from in front of the pins 34 carried by the bed and the camera is permitted to open. As soon as the push button 16 is released, the pins 13 may ride over the hooks 15 and thus the camera will be held in an operative position. To close the camera, the push button 16 is again depressed, rocking the yoke and causing the lugs 39 to thrust the bed braces 12 simultaneously rearwardly to the Fig. 2 position, in which the camera can be closed. As soon as the push button 16 is released, the pins 34 will be engaged by the lugs 36 and the camera bed will be held in a closed position.

It is obvious that our invention can be applied to a variety of different types of cameras and we are not to be limited to the specific application of our invention to a particular type of camera as shown in the drawing but only by the appended claims.

Having now described our invention what we claim and desire to secure by Letters Patent of the United States is:

1. In a folding camera, the combination with a camera body, of a bed hinged thereto, bed braces for holding the camera bed in an open position, said braces being pivotally and slidably attached to the bed and camera body, said slidable connection including spaced walls forming a slot and having a hook therein and a pin about which the spaced walls may slide, means carried by the camera body for moving the bed braces to release the hook and pin construction, and a push button operating through a camera wall and engaging said means, whereby said bed may be swung upon its hinge.

2. In a folding camera, the combination with a camera body, of a bed hinged thereto, bed braces for holding the camera bed in an open position, said braces being pivotally and slidably attached to the bed and camera body, said slidable connection including spaced walls forming a slot and having a hook therein and a pin about which the spaced walls may slide, means carried by the camera body for moving the bed braces to release the hook and pin construction, and a push button operating through a camera wall and engaging said means, whereby said bed may be swung upon its hinge, said means also constituting a latch element, a second latch element on the camera bed, the two latch elements being adapted, when engaged, to hold the bed in a closed position against the camera body.

3. In a folding camera, the combination with a camera body, of a bed hinged thereto, bed braces for holding the camera bed in an open position, said braces being pivotally and slidably attached to the bed and camera body, said slidable connection including spaced walls forming a slot and having a hook therein and a pin about which the spaced walls may slide, means carried by the camera body for moving the bed braces to release the hook and pin construction, said means comprising a yoke pivotally mounted on the camera body and including arms adapted to engage said bed braces, whereby said bed may be swung upon its hinge.

4. In a folding camera, the combination with a camera body, of a bed hinged thereto, bed braces for holding the camera bed in an open position, said braces being pivotally and slidably attached to the bed and camera body, said slidable connection including spaced walls forming a slot and having a hook therein and a pin about which the spaced walls may slide, means carried by the camera body for moving the bed braces to release the hook and pin construction, said means comprising a yoke pivotally mounted on the camera body and including arms adapted to engage said bed braces, a push button operating through a camera wall and cooperating with said yoke to rock said yoke on the pivotal mount, whereby said bed may be swung upon its hinge.

5. In a folding camera, the combination with a camera body, of a bed hinged thereto, bed braces for holding the camera bed in an open position, said braces being pivotally and slidably attached to the bed and camera body, said slidable connection including spaced walls forming a slot and having a hook therein and a pin about which the spaced walls may slide, means carried by the camera body for moving the bed braces to release the hook and pin construction, said means comprising a yoke pivotally mounted on the camera body and including arms adapted to engage said bed braces, a push button operating through a wall of said camera and having a cam engagement with said yoke for moving the same upon its pivotal support for releasing said bed braces.

6. In a folding camera, the combination with a camera body, of a bed hinged thereto, bed braces for holding the camera bed in an open position, said braces being pivotally and slidably attached to the bed and camera body, said slidable connection including spaced walls forming a slot and having a hook therein and a pin about which the spaced walls may slide, means carried by the camera body for moving the bed braces to release the hook and pin construction, said means comprising a yoke pivotally mounted on the camera body and including arms adapted to engage said bed braces, a cam surface on the yoke, an arm having a surface engaging said cam surface, and a push button for operating the arm from the outside of the camera body, whereby the bed braces may be simultaneously released by the push button.

7. In a folding camera, the combination with a camera body, of a bed hinged thereto, bed braces for holding the camera bed in an open position, said braces being pivotally and slidably attached to the bed and camera body, said slidable connection including spaced walls forming a slot and having a hook therein and a pin about which the spaced walls may slide, means carried by the camera body for moving the bed braces to release the hook and pin construction, said means comprising a yoke pivotally mounted on the camera body and including arms adapted to engage said bed braces, cam surfaces on the yoke, an arm having cam surfaces to engage the yoke cam surfaces for moving the latter in two directions, and a single means on the outside of the camera and engaging the arm for moving the yoke.

8. In a folding camera, the combination with a camera body, of a bed hinged thereto, bed braces pivotally attached to the camera bed and having a pin and slot connection with the camera body, a hook at the end of the slot adapted to receive the pin and retain the bed brace therein, a yoke pivoted to the camera body and engaging both bed braces near the slotted end to release the pins from the slots when moved on its pivot, and means carried by the camera body for rocking the yoke in two directions upon its pivot, said means including a member extending through a camera wall and terminating in a single releasing device whereby the bed braces may be simultaneously released.

9. In a folding camera, the combination with a camera body, of a bed hinged thereto, bed braces pivotally attached to the camera bed and having a pin and slot connection with the camera body, a hook at the end of the slot adapted to receive the pin and retain the bed brace therein, a yoke pivoted to the camera body and engaging both bed braces near the slotted end to release the pins from the slots when moved on its pivot, and means carried by the camera body for rocking the yoke in two directions upon its pivot, said means including a member extending through a camera wall and terminating in a single releasing device whereby said yoke may be rocked, latching elements on the yoke and camera bed adapted to engage and hold the camera bed closed, whereby said releasing device may both release the latching elements and the bed braces.

10. In a folding camera, the combination with a camera body, of a bed hinged thereto, bed braces pivotally attached to the camera bed and having a pin and slot connection with the camera body, a hook at the end of the slot adapted to receive the pin and retain the bed brace therein, a yoke pivoted to the camera body and engaging both bed braces near the slotted end to release the pins from the slots when moved on its pivot, and means carried by the camera body for rocking the yoke in two directions upon its pivot, a spring for holding the yoke in a normal position of rest, means including a member extending through a camera wall and terminating in a single releasing device whereby the bed braces may be simultaneously released by moving the yoke from its normal position of rest.

11. In a folding camera, the combination with a camera body, of a bed hinged thereto, bed braces pivotally attached to the camera bed and having a pin and slot connection with the camera body, a hook at the end of the slot adapted to receive the pin and retain the bed brace therein, a yoke pivoted to the camera body and engaging both bed braces near the slotted end to release the pins from the slots when moved on its pivot, and means carried by the camera body for rocking the yoke in two directions upon its pivot, a spring for holding the yoke in a normal position of rest, said means including a member extending through a camera wall and terminating in a single releasing device whereby said yoke may be rocked, latching elements on the yoke and camera bed adapted to engage and hold the camera bed closed, when said yoke reaches a normal position of rest.

JOHN CHRISTIE.
CHESTER W. CRUMRINE.